United States Patent
Lee et al.

(10) Patent No.: US 7,050,128 B2
(45) Date of Patent: May 23, 2006

(54) LIQUID CRYSTAL DISPLAY COMPRISING A FRAME HAVING FIRST AND SECOND HOOKING MEMBERS FOR COUPLING WITH THE FRONT BEZEL AND A DIFFUSER PLATE

(75) Inventors: Kuo-Chih Lee, Tainan (TW); Chih-Kang Wu, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 42 days.

(21) Appl. No.: 10/820,495

(22) Filed: Apr. 7, 2004

(65) Prior Publication Data

US 2005/0073624 A1   Apr. 7, 2005

(30) Foreign Application Priority Data

Oct. 3, 2003   (TW) ............................... 92127521 A

(51) Int. Cl.
  *G02F 1/1335*   (2006.01)
  *G02F 1/133*   (2006.01)
  *F21V 7/04*   (2006.01)

(52) U.S. Cl. .......................... 349/58; 349/61; 362/632; 362/633

(58) Field of Classification Search ......... 362/632–633
    See application file for complete search history.

(56) References Cited

U.S. PATENT DOCUMENTS

| 5,442,470 A * | 8/1995 | Hashimoto .................... 349/58 |
| 5,729,310 A * | 3/1998 | Horiuchi et al. .............. 349/62 |
| 2003/0122992 A1* | 7/2003 | Hayashimoto et al. ........ 349/58 |

* cited by examiner

*Primary Examiner*—Andrew Schechter
*Assistant Examiner*—W. Patty Chen
(74) *Attorney, Agent, or Firm*—Thomas, Kayden, Horstemeyer & Risley

(57) ABSTRACT

A liquid crystal display comprises a front bezel, a frame and a diffuser plate. The front bezel has a first fastened member and the diffuser plate has a second fastened member. The frame is deposited below the front bezel and the diffuser plate is deposited below the frame. The frame has a first fastening member with respect to the first fastened member and a second fastening member with respect to the second fastened member. The first fastening member and the second fastening member are respectively coupled with the first fastened member and with the second fastened member simultaneously so that the front bezel, the frame and the diffuser plate are integrated as a whole.

18 Claims, 4 Drawing Sheets ical display, of which the light source can be easily changed.
LIQUID CRYSTAL DISPLAY COMPRISING A FRAME HAVING FIRST AND SECOND HOOKING MEMBERS FOR COUPLING WITH THE FRONT BEZEL AND A DIFFUSER PLATE This application claims the benefit of Taiwan application Serial No. 092127521, filed Oct. 3, 2003, the subject matter of which is incorporated herein by reference.

BACKGROUND OF THE INVENTION

1. Field of the Invention

The invention relates in general to a liquid crystal display, and more particularly to a liquid crystal display, of which the light source can be easily changed.

2. Description of the Related Art

Liquid crystal displays (LCDs) are widely applied in various electrical products such as personal digital assistants (PDAs), notebook computers, digital cameras, digital camcorders, mobile telephones, computer monitors, liquid crystal televisions, and the like because the technology for manufacturing the LCDs is rapidly developed and the LCDs have the advantages of being light, thin, power-saving and radiation-free. However, because the LCD panel is a panel that cannot emit light rays itself, a backlight module is needed to provide light rays and to achieve the display function.

FIG. 1 is a schematic view of a conventional LCD. Referring first to FIG. 1, a liquid crystal display (LCD) 100 at least includes a front bezel 110, a LCD panel 111 and a direct backlight module 120. The backlight module 120 includes a frame 130, a multilayer optical film 112, a diffuser plate 113, a lamp holder 115 and several light sources 114. The light sources 114 are several parallel cold cathode fluorescent lamps (CCFLs) disposed within the lamp holder 115. The multilayer optical film 112 may include a diffusing sheet and a prism sheet.

The cold cathode fluorescent lamps have limited life-time. When the performance of the cold cathode fluorescent lamps 114 deteriorates, they have to be changed to provide sufficient light or luminance to the liquid crystal display 100. The conventional process of changing the light sources 114 is as follows. The front bezel 110 is taken out after the front bezel 110 and the frame 130 are separated apart. Then, the LCD panel 111, the frame 130, the multilayer optical film 112 and the diffuser plate 113 are removed sequentially. Next, the deteriorated light sources 114 are changed. All components of the liquid crystal display 100 can be re-assembled by the reversed procedure.

However, the changing procedure of the conventional liquid crystal display 100 is time-consuming. It includes complex steps of separating the front bezel 110 and the frame 130, and sequentially moving the front bezel 110, the LCD panel 111, the frame 130, the multilayer optical film 112 and the diffuser plate 113.

Another disadvantage of the conventional liquid crystal display 100 is that the LCD panel 111, the multilayer optical film 112 and the diffuser plate 113 may hit and scrape each other during the process of changing the light sources 114.

SUMMARY OF THE INVENTION

In view of the foregoing, it is an object of the present invention to provide a liquid crystal display enabling users to directly change the light source with great convenience and the damage of the LCD panel, the multilayer optical film and the diffuser plate caused by hitting and scratching during the changing process can be prevented.

An object of the present invention is to provide a liquid crystal display including a front bezel, a frame and a diffuser plate. The front bezel has a first fastened member and the diffuser plate has a second fastened member. The frame is deposited below the front bezel and the diffuser plate is deposited below the frame. The frame has a first fastening member with respect to the first fastened member and a second fastening member with respect to the second fastened member. The first fastening member and the second fastening member are respectively coupled with the first fastened member and with the second fastened member simultaneously so that the front bezel, the frame and the diffuser plate are integrated as a whole.

Another object of the present invention is to provide a liquid crystal display including a front bezel, a frame, a diffuser plate, a panel and a multilayer optical film. The front bezel has a bottom surface, a side surface and a first fastened member. The side surface of the front bezel is perpendicular to the bottom surface of the front bezel and the first fastened member is formed in the side surface of the front bezel. The frame is deposited below the front bezel and has an upper surface, a bottom surface and a side extending section. The side extending section is perpendicular to the bottom surface. The first fastening member is disposed on the side extending section of the frame, and the second fastening member is disposed on the bottom surface of the frame. The diffuser plate is deposited below the frame and has an upper surface and a second fastened member. The second fastened member is formed in the upper surface of the diffuser plate. The panel is disposed between the front bezel and the frame, and the multilayer optical film is disposed between the frame and the diffuser plate. The upper surface of the frame is opposite to the bottom surface of the front bezel and the bottom surface of the frame is oppose to the upper surface of the diffuser plate. The frame further includes an exterior edge and an interior edge. The first fastening member is disposed on the exterior edge of the frame and the second fastening member is disposed on the interior edge of the frame. The first fastening member and the second fastening member are respectively coupled with the first fastened member and with the second fastened member simultaneously so that the front bezel, the panel, the frame, the multilayer optical film and the diffuser plate are integrated as a whole.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1:
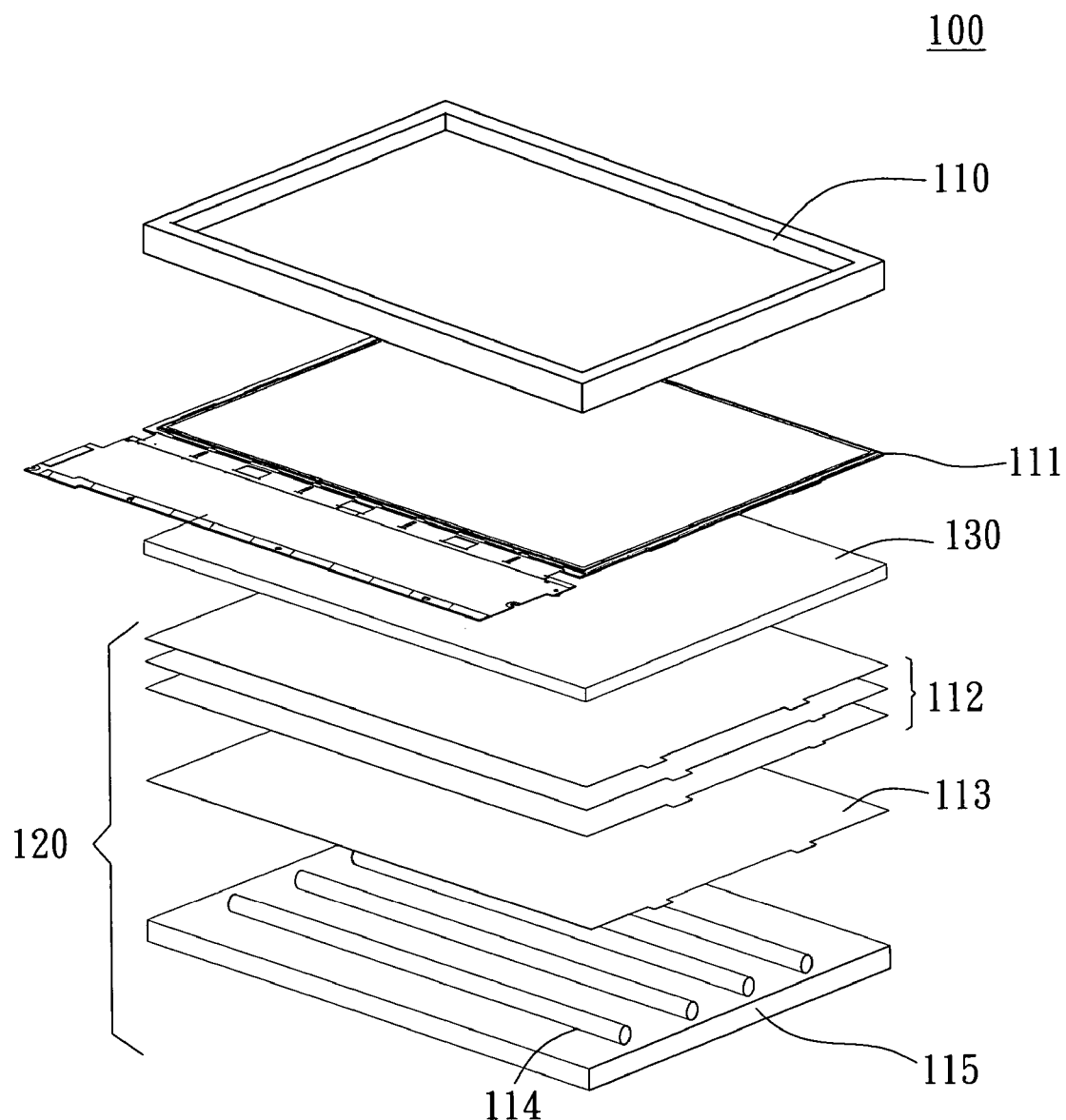
FIG. 1 is a schematic view of a conventional LCD.
Figure 2:
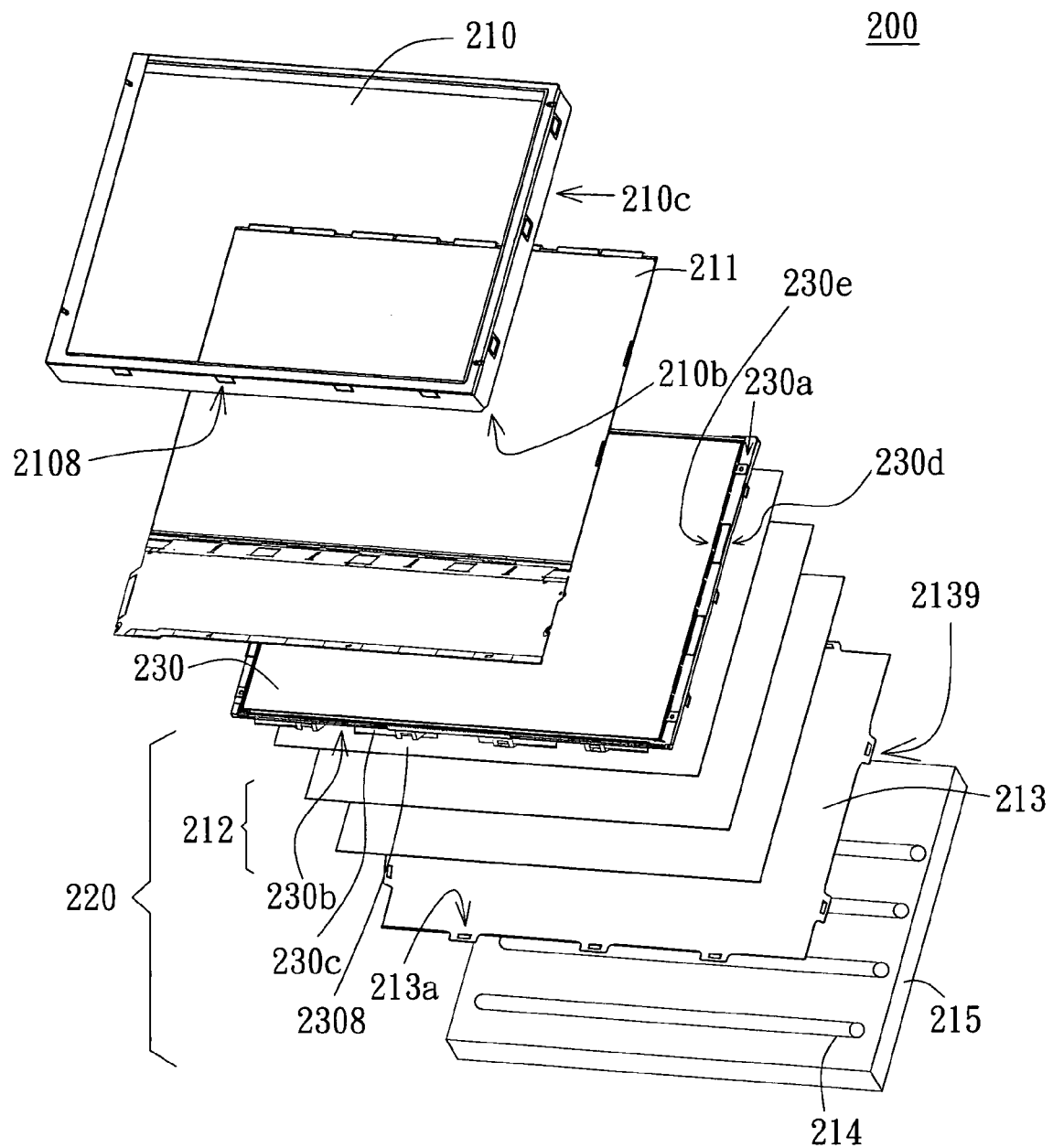
FIG. 2 is a schematic view of a LCD according to a preferred embodiment of the invention.

FIG. 2 is a schematic view of a LCD according to a preferred embodiment of the invention. Referring first to FIG. 2, a liquid crystal display 200 at least includes a front bezel 210, a panel 211 and a direct backlight module 220. The backlight module 220 includes a frame 230, a multilayer optical film 212 and a diffuser plate 213, light sources 214 and a lamp holder 215. The panel 211 is a LCD panel and the light sources 214 are preferably several parallel cold cathode fluorescent lamps (CCFLs) disposed within the lamp holder 215. The multilayer optical film 212 preferably includes a diffusing sheet and a prism sheet.

The frame 230 is removably disposed between the front bezel 210 and the diffuser plate 213. The panel 211 is disposed between the front bezel 210 and the frame 230, and the multilayer optical film 212 is disposed between the frame 230 and the diffuser plate 213. Light emitted from the light sources 214 is diffused by the diffuser plate 213 and is filtered through the multilayer optical film 212 to reach and penetrate the panel 211. Then, the image is visible.

The front bezel 210 has a bottom surface 210b, a side surface 210c and a first fastened member 2108. The side surface of the front bezel 210c is perpendicular to the bottom surface of the front bezel 210b and the first fastened member 2108 is formed in the side surface of the front bezel 210c. The first fastened member 2108 is preferably a notch in the side surface of the front bezel 210c.

The frame 230 has an upper surface 230a, a bottom surface 230b, a side extending section 230c, a first fastening member 2308 and a second fastening member 2309. The upper surface of the frame 230a is opposite to the bottom surface of the front bezel 210b so that the frame 230 is deposited below the front bezel 210. The side extending section of the frame 230c is perpendicular to the bottom surface of the frame 230b. The first fastening member 2308 is disposed on the side extending section of the frame 230c and is opposite to the first fastened member 2108 of the first bezel 210. The second fastening member 2309 is disposed on the bottom surface of the frame 230b. The first fastening member 2308 and the second fastening member 2309 are preferably a hook in the side extending section of the frame 230c and a hook in the bottom surface of the frame 230b, respectively.

The diffuser plate 213 has an upper surface 213a and a second fastened member 2139. The upper surface of the diffuser plate 213a is opposite to the bottom surface of the frame 230b so that the diffuser plate 213 is deposited below the frame 230. The second fastened member 2139 is formed in the upper surface of the diffuser plate 213a and is opposite to the second fastening member 2309 of the frame. The second fastened member 2139 is preferably a notch in the upper surface of the diffuser plate 213a.

Figure 3:
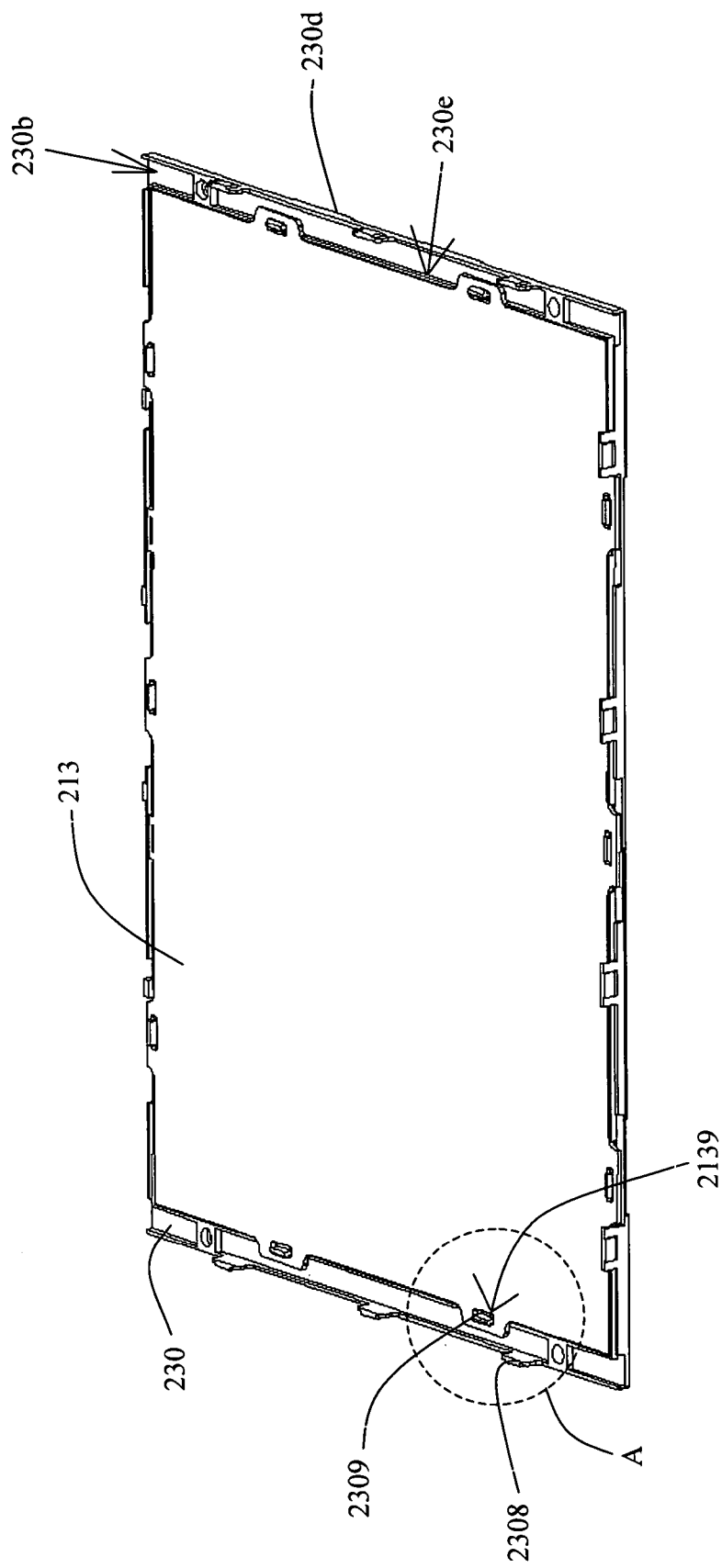
FIG. 3 shows the inverted frame in FIG. 2 when the frame is engaged with the diffuser plate.
Figure 4:
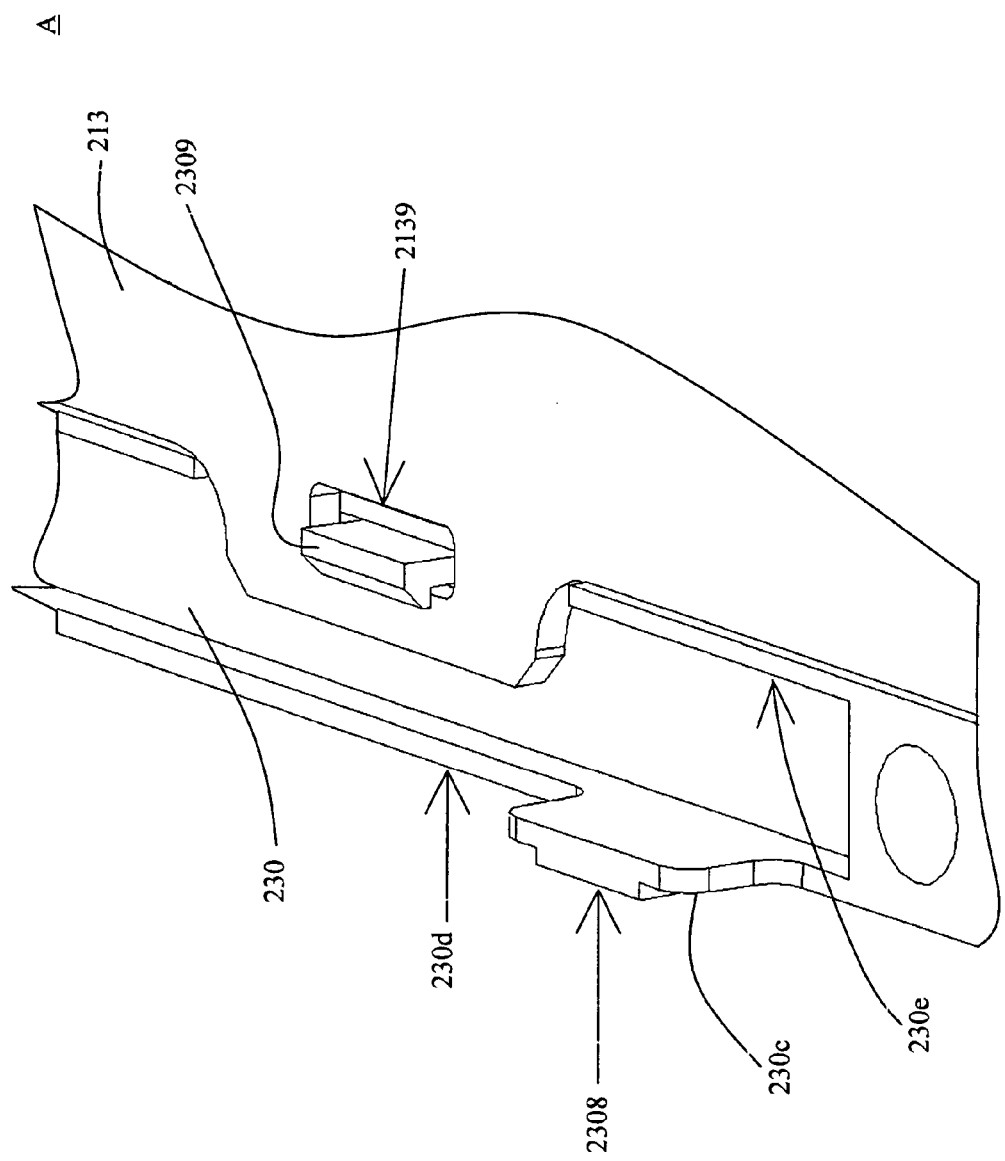
FIG. 4 is an enlarged view of the identified part A in FIG. 3.

Both referring to FIG. 3 and FIG. 4, FIG. 3 shows the inverted frame in FIG. 2 when the frame is engaged with the diffuser plate, and FIG. 4 is an enlarged view of the identified part A in FIG. 3. The frame 230 further includes an exterior edge 230d and an interior edge 230e. The first fastening member 2308 is disposed on the exterior edge 230d of the frame 230 and the second fastening member 2309 is disposed on the interior edge 230e of the frame 230.

The first fastening member 2308 and the second fastening member 2309 can be respectively coupled with the first fastened member 2108 and with the second fastened member 2139 simultaneously so that the front bezel 210, the panel 211, the frame 230, the multilayer optical film 212 and the diffuser plate 213 are integrated as a whole.

The assembling process of the liquid crystal display 200 is performed as follows. Firstly, take the frame 230 of the backlight module 220 as the principle part of the liquid crystal display 200, and then the frame 230 and the diffuser plate 213 are fastened together after the multilayer optical film 212 is disposed therebetween. Secondly, the front bezel 210 and the frame 230 are fastened together after the panel 211 is disposed therebetween. Finally, the whole of the front bezel 210, the panel 211, the frame 230, the multilayer optical film 212 and the diffuser plate 213 is connected with the lamp holder 215 where the light sources 214 are disposed. As a result, the liquid crystal display 200 is completely assembled.

One of the characteristics of the invention is that the front bezel 210, the panel 211, the frame 230, the multilayer optical film 212 and the diffuser plate 213 can be integrated as a whole as a result of the combination of first fastening member 2308 with respect to the first fastened member 2108 and the second fastening member 2309 with respect to the second fastened member 2139, simultaneously. That allows users to directly change the light sources 214 with great convenience by simply taking out the whole of the front bezel 210, the panel 211, the frame 230, the multilayer optical film 212 and the diffuser plate 213. Thus, the processing time can be reduced.

Also, the panel 211 is disposed between the front bezel 210 and the frame 230 when the first fastening member 2308 is buckled with the first fastened member 2108. The multilayer optical film 212 is disposed between the frame 230 and the diffuser plate 213 when the second fastening member 2309 is buckled with the second fastened member 2139. By this, the damage of the panel 211, the multilayer optical film 212 and the diffuser plate 213 caused by hitting and scratching during the changing process, which occurs in the conventional Liquid crystal display 100, is prevented.

Further, the material of the frame 230 is preferably plastic (PC), and the frame 230 is preferably manufactured by mechanical shooting. The first fastened member 2108 and the second fastened member 2139 are preferably notches, and the first fastening member 2308 and the second fastening member 2309 are preferably hooks. Hooks can be inserted into notches and be fastened, so that the first fastening member 2308 and the second fastening member 2309 can be fastened with the first fastened member 2108 and the second fastened member 2139, respectively. In addition, the first fastening member 2308 and the second fastening member 2309 can be removably disposed in the frame 230 and slide movably thereon rather than above-mentioned fixed ones.

However, the present inventions are not limited in what are described above. It will be understood to one skilled in the art that various coupling means can be applied to couple the front bezel 210, the frame 230 and the diffuser plate 213. For example, the first fastened member 2108 can be disposed on the side surface of the front bezel 210b. The diffuser plate 213 can have a side section or a side extending section, and the second fastened member 2139 can be disposed therein. Moreover, the first fastening member 2308 and the second fastening member 2309 can be respectively disposed on the upper surface of the frame 230a and the bottom surface of the frame 230c, instead of being disposed on the exterior edge 230d and the interior edge 230e of the frame 230 in the preferred embodiment of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display, comprising:
   a front bezel, having a first fastened member;
   a frame, deposited below the front bezel; and
   a diffuser plate, deposited below the frame and having a second fastened member;
   wherein the frame has a first hooking member with respect to the first fastened member and a second hooking member with respect to the second fastened member; the first hooking member and the second hooking member are respectively coupled with the first fastened member and with the second fastened member simultaneously so that the front bezel, the frame and the diffuser plate are integrated as a whole.

2. The liquid crystal display according to claim 1, wherein the liquid crystal display further comprises a panel disposed between the front bezel and the frame; the panel further is fastened between the front bezel and the frame while the first hooking member is coupled with the first fastened member.

3. The liquid crystal display according to claim 1, wherein the liquid crystal display further comprises a multilayer optical film disposed between the frame and the diffuser plate; the multilayer optical film further is fastened between the frame and the diffuser plate while the second hooking member is coupled with the second fastened member.

4. The liquid crystal display according to claim 1, wherein the liquid crystal display further comprises:
   a panel disposed between the front bezel and the frame; and
   a multilayer optical film disposed between the frame and the diffuser plate;
   wherein the frame comprises an upper surface, a bottom surface and a side extending section; the side extending section is perpendicular to the bottom surface; the first hooking member is disposed on the side extending section of the frame, and the second hooking member is disposed on the bottom surface of the frame;
   wherein the front bezel comprises a bottom surface and a side surface; the side surface of the front bezel is perpendicular to the bottom surface of the front bezel and the first fastened member is formed in the side surface of the front bezel;
   wherein the diffuser plate comprises an upper surface opposite to the bottom surface of the frame and the second fastened member is formed in the upper surface of the diffuser plate; the first hooking member and the second hooking member are respectively coupled with the first fastened member and with the second fastened member simultaneously so that the front bezel, the panel, the frame, the multilayer optical film and the diffuser plate are integrated as a whole.

5. The liquid crystal display according to claim 1, wherein the frame further comprises an exterior edge and an interior edge; the first hooking member is disposed on the exterior edge of the frame and the second hooking member is disposed on the interior edge of the frame.

6. The liquid crystal display according to claim 5, wherein the front bezel comprises a bottom surface and a side surface, the side surface of the frame is perpendicular to the bottom surface of the frame, the bottom surface of the front bezel is opposite to the upper surface of the frame, the first fastened member is formed in the side surface of the front bezel; and
   wherein the diffuser plate comprises an upper surface opposite to a bottom surface of the frame and the second fastened member is formed in the upper surface of the diffuser plate.

7. The liquid crystal display according to claim 1, wherein the first fastened member and the second fastened member are notches.

8. The liquid crystal display according to claim 1, wherein the first hooking member and the second hooking member are hooks.

9. The liquid crystal display according to claim 1, wherein the material of the frame is plastic (PC).

10. The liquid crystal display according to claim 1, wherein the frame is manufactured by mechanical shooting.

11. The liquid crystal display according to claim 1, wherein the first hooking member and the second hooking member are disposed to slide movably on the frame.

12. A liquid crystal display, comprising:
    a front bezel, having a bottom surface, a side surface and a first fastened member; the side surface of the front bezel being perpendicular to the bottom surface of the front bezel and the first fastened member being formed in the side surface of the front bezel;
    a frame, deposited below the front bezel and having an upper surface, a bottom surface and a side extending section; the side extending section being perpendicular to the bottom surface; the first hooking member being disposed on the side extending section of the frame, and the second hooking member being disposed on the bottom surface of the frame;
    a diffuser plate, deposited below the frame and having an upper surface and a second fastened member; the second fastened member being formed in the upper surface of the diffuser plate;
    a panel disposed between the front bezel and the frame; and
    a multilayer optical film disposed between the frame and the diffuser plate;
    wherein the upper surface of the frame is oppose to the bottom surface of the front bezel and the bottom surface of the frame is oppose to the upper surface of the diffuser plate;
    wherein the frame further comprises an exterior edge and an interior edge; the first hooking member is disposed on the exterior edge of the frame and the second hooking member is disposed on the interior edge of the frame; the first hooking member and the second hooking member are respectively coupled with the first fastened member and with the second fastened member simultaneously so that the front bezel, the panel, the frame, the multilayer optical film and the diffuser plate are integrated as a whole.

13. The liquid crystal display according to claim 12, wherein the first fastened member and the second fastened member are notches.

14. The liquid crystal display according to claim 12, wherein the first hooking member and the second hooking member are hooks.

15. The liquid crystal display according to claim 12, wherein the material of the frame is plastic (PC).

16. The liquid crystal display according to claim 12, wherein the frame is manufactured by mechanical shooting.

17. The liquid crystal display according to claim 12, wherein the first hooking member and the second hooking member are disposed to slide movably on the frame.

18. A liquid crystal display, comprising:

a frame, deposited below the front bezel and having a hook; and a diffuser plate, deposited below the frame and having a notch, wherein the notch is coupled with the hook so that the frame and the diffuser plate are integrated as a whole.

* * * * *